United States Patent
Ormazabal et al.

(10) Patent No.: US 9,473,529 B2
(45) Date of Patent: Oct. 18, 2016

(54) PREVENTION OF DENIAL OF SERVICE (DOS) ATTACKS ON SESSION INITIATION PROTOCOL (SIP)-BASED SYSTEMS USING METHOD VULNERABILITY FILTERING

(75) Inventors: Gaston S. Ormazabal, New York, NY (US); Henning G. Schulzrinne, Leonia, NJ (US); Somdutt B. Patnaik, West New York, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 2957 days.

(21) Appl. No.: 11/557,739

(22) Filed: Nov. 8, 2006

(65) Prior Publication Data

US 2008/0127349 A1    May 29, 2008

(51) Int. Cl.
*H04L 29/06*        (2006.01)
(52) U.S. Cl.
CPC ....... *H04L 63/1458* (2013.01); *H04L 65/1006* (2013.01); *H04L 65/1069* (2013.01); *H04L 2463/141* (2013.01)
(58) Field of Classification Search
CPC ........... H04L 63/1458; H04L 65/1069; H04L 65/1006; H04L 2463/141; H04L 63/1416; H04L 63/1408; H04L 63/1441
USPC .................................................... 726/22, 25
See application file for complete search history.

(56) References Cited

U.S. PATENT DOCUMENTS

| | | |
|---|---|---|
| 5,414,704 A | 5/1995 | Spinney |
| 5,465,286 A | 11/1995 | Clare et al. |
| 5,473,607 A | 12/1995 | Hausman et al. |
| 5,828,653 A | 10/1998 | Goss |
| 5,859,980 A | 1/1999 | Kalkunte |
| 5,909,686 A | 6/1999 | Muller et al. |
| 5,936,962 A | 8/1999 | Haddock et al. |
| 5,991,270 A | 11/1999 | Zwan et al. |
| 6,154,775 A | 11/2000 | Coss et al. |
| 6,175,902 B1 | 1/2001 | Runaldue et al. |
| 6,680,089 B2 | 1/2004 | Miyake et al. |
| 6,701,346 B1 * | 3/2004 | Klein ........................... 709/206 |
| 6,707,817 B1 | 3/2004 | Kadambi et al. |
| 6,816,910 B1 | 11/2004 | Ricciulli |
| 6,826,616 B2 | 11/2004 | Larson et al. |
| 6,880,089 B1 | 4/2005 | Bommareddy et al. |
| 6,920,107 B1 | 7/2005 | Qureshi et al. |
| 6,930,598 B2 | 8/2005 | Weiss |
| 6,934,756 B2 | 8/2005 | Maes |
| 7,007,299 B2 | 2/2006 | Ioele et al. |
| 7,072,291 B1 | 7/2006 | Jagadeesan et al. |
| 7,076,393 B2 | 7/2006 | Ormazabal et al. |
| 7,254,832 B1 | 8/2007 | Christie |
| 7,340,166 B1 | 3/2008 | Sylvester et al. |
| 7,385,927 B2 | 6/2008 | Gygi et al. |
| 7,385,931 B2 | 6/2008 | Magnaghi et al. |
| 7,421,734 B2 | 9/2008 | Ormazabal et al. |

(Continued)

OTHER PUBLICATIONS

Rosenberg, et al., "SIP: Session Initiation Protocol", Internet Engineering Task Force, Request for Comments 3261, Jun. 2002.

(Continued)

*Primary Examiner* — Ali Abyaneh
*Assistant Examiner* — Narciso Victoria

(57) ABSTRACT

A device receives an attack on a Session Initiation Protocol (SIP) based device, and applies, based on a type of the attack, a method vulnerability based filter to the attack.

3 Claims, 16 Drawing Sheets

(56) References Cited

U.S. PATENT DOCUMENTS

| | | |
|---|---|---|
| 7,440,573 B2 | 10/2008 | Lor et al. |
| 7,499,405 B2 | 3/2009 | Gilfix et al. |
| 7,634,249 B2 | 12/2009 | Hahn et al. |
| 7,653,938 B1 | 1/2010 | Touitou et al. |
| 7,672,336 B2 | 3/2010 | Bharrat et al. |
| 7,716,725 B2 | 5/2010 | Xie |
| 7,721,091 B2 | 5/2010 | Iyengar et al. |
| 8,027,251 B2 | 9/2011 | Ormazabal et al. |
| 2002/0083187 A1 | 6/2002 | Sim et al. |
| 2002/0112073 A1 | 8/2002 | MeLampy et al. |
| 2002/0156903 A1 | 10/2002 | Bach Corneliussen |
| 2003/0009561 A1 | 1/2003 | Sollee |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093562 A1 | 5/2003 | Padala |
| 2003/0093563 A1 | 5/2003 | Young et al. |
| 2003/0115321 A1 | 6/2003 | Edmison et al. |
| 2003/0117961 A1 | 6/2003 | Chuah et al. |
| 2003/0120816 A1 | 6/2003 | Berthaud et al. |
| 2003/0126464 A1 | 7/2003 | McDaniel et al. |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0001443 A1 | 1/2004 | Soon et al. |
| 2004/0013086 A1 | 1/2004 | Simon et al. |
| 2004/0015579 A1 | 1/2004 | Cooper et al. |
| 2004/0028035 A1 | 2/2004 | Read |
| 2004/0034793 A1 | 2/2004 | Yuan |
| 2004/0039938 A1 | 2/2004 | Katz et al. |
| 2004/0068668 A1 | 4/2004 | Lor et al. |
| 2004/0128554 A1 | 7/2004 | Maher et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0236966 A1 | 11/2004 | D'Souza et al. |
| 2004/0244058 A1 | 12/2004 | Carlucci et al. |
| 2004/0255156 A1 | 12/2004 | Chan et al. |
| 2005/0018618 A1 | 1/2005 | Mualem et al. |
| 2005/0050377 A1 | 3/2005 | Chan et al. |
| 2005/0076235 A1 | 4/2005 | Ormazabal et al. |
| 2005/0165917 A1 | 7/2005 | Le et al. |
| 2005/0201320 A1 | 9/2005 | Kiss et al. |
| 2005/0201357 A1 | 9/2005 | Poyhonen |
| 2005/0232229 A1* | 10/2005 | Miyamoto et al. ........... 370/351 |
| 2006/0007868 A1 | 1/2006 | Shinomiya |
| 2006/0013192 A1 | 1/2006 | Le et al. |
| 2006/0075084 A1 | 4/2006 | Lyon |
| 2006/0075132 A1 | 4/2006 | Liu |
| 2006/0077981 A1 | 4/2006 | Rogers |
| 2006/0146792 A1 | 7/2006 | Ramachandran et al. |
| 2006/0165060 A1 | 7/2006 | Dua |
| 2006/0227766 A1 | 10/2006 | Mickle et al. |
| 2007/0022479 A1 | 1/2007 | Sikdar et al. |
| 2007/0110053 A1 | 5/2007 | Soni et al. |
| 2007/0118894 A1 | 5/2007 | Bhatia |
| 2007/0121596 A1* | 5/2007 | Kurapati et al. ............. 370/356 |
| 2007/0192863 A1 | 8/2007 | Kapoor et al. |
| 2008/0037447 A1* | 2/2008 | Garg et al. .................... 370/260 |
| 2008/0040801 A1 | 2/2008 | Buriano et al. |

OTHER PUBLICATIONS

Kuthan, et al., "Middlebox Communication: Framework and Requirements-Internet Draft," Internet Engineering Task Force (IETF), http://tools.ietf.org/html/draft-kuthan-midcom-framework-00, 26 pages, Nov. 2000.

Sisalem, et al., "Denial of Service Attacks Targeting a SIP VoIP Infrastructure: Attack Scenarios and Prevention Mechanisms", IEEE Network, vol. 20, Issue: 5, Publication Year: 2006, pp. 26-31.

* cited by examiner

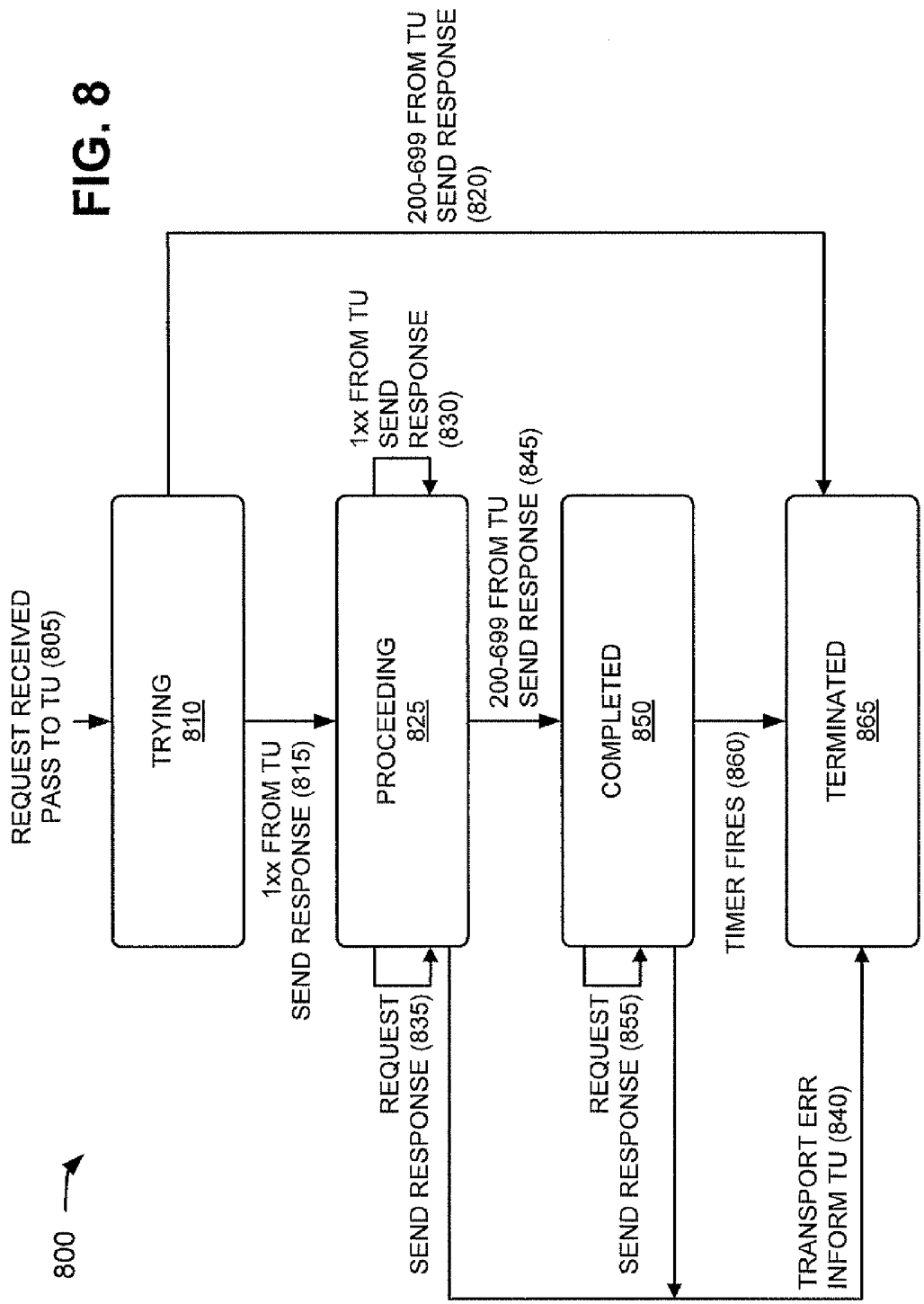

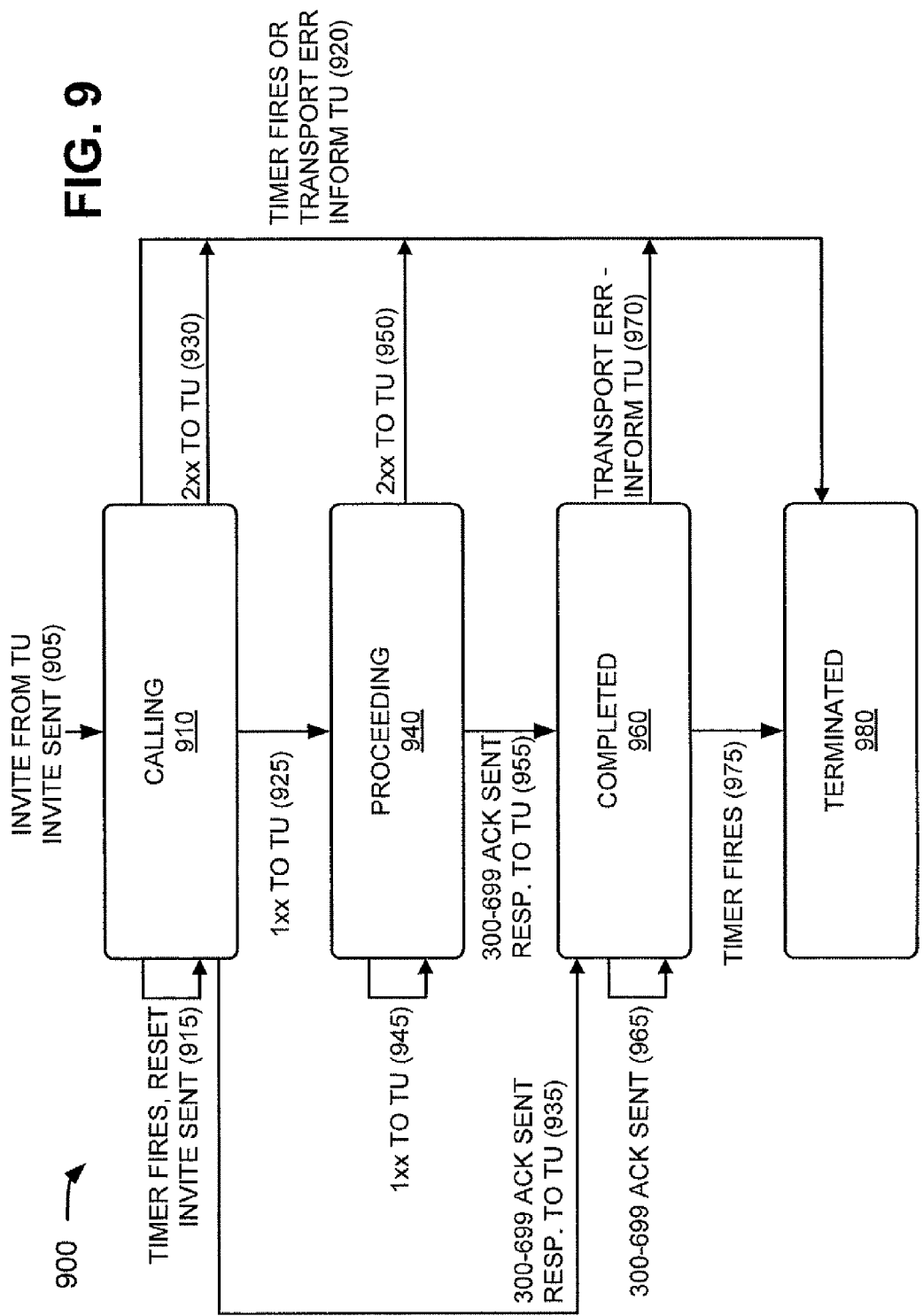

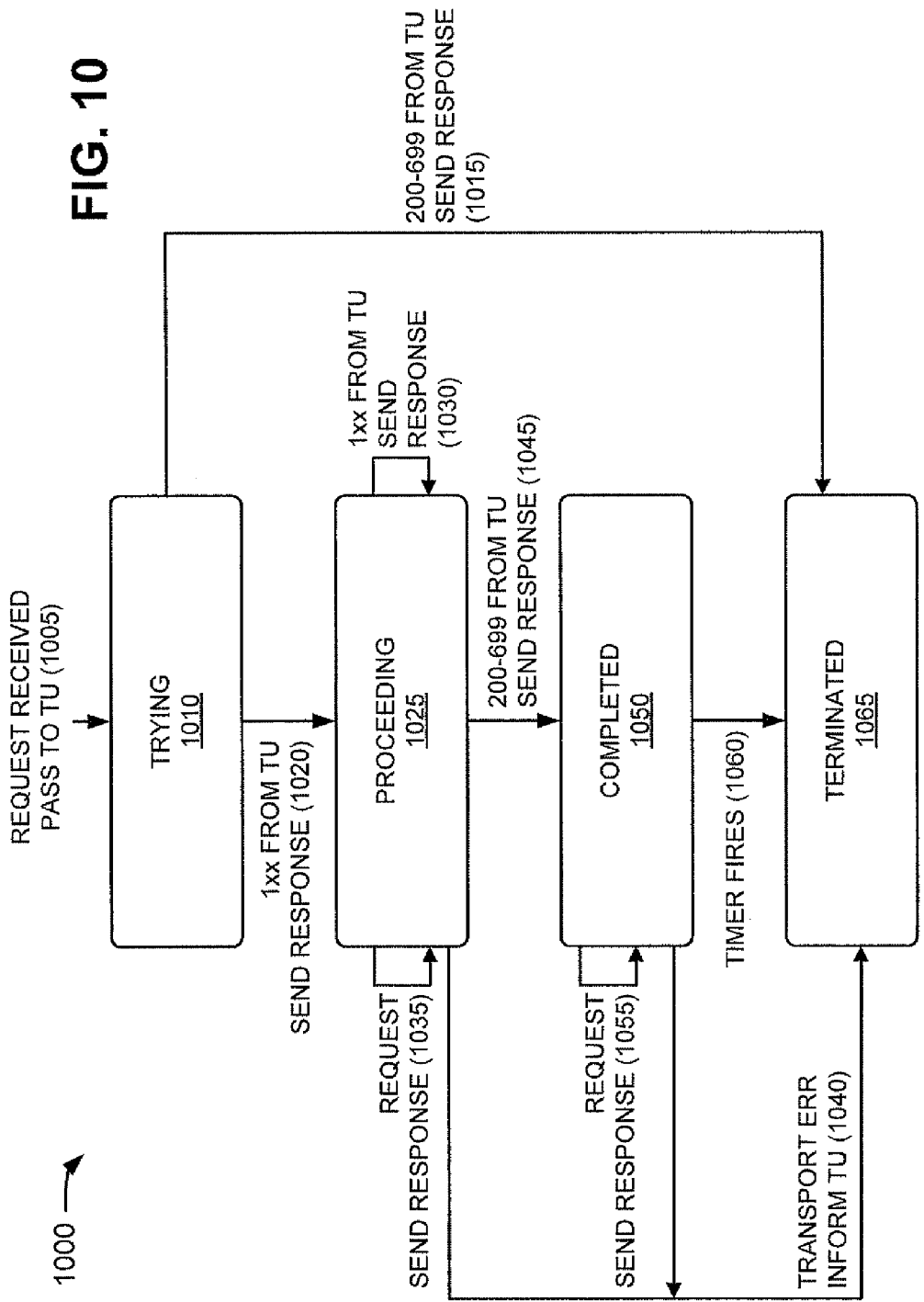

PREVENTION OF DENIAL OF SERVICE (DOS) ATTACKS ON SESSION INITIATION PROTOCOL (SIP)-BASED SYSTEMS USING METHOD VULNERABILITY FILTERING

BACKGROUND INFORMATION

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Denial of Service (DoS) attacks may be characterized by explicit attempts of attackers to prevent legitimate users from using a service. DoS attacks continue to be the main threat facing network operators. As telephony services move to IP (Internet Protocol) networks, Voice over IP (VoIP) infrastructure components and end devices, may become attractive DoS attack targets. For example, carriers have begun a program for the delivery of advanced voice and data services over IP that implements security measures in order to protect both the service providing the network assets, as well as the customer networks from service disruption. As service providers develop value added revenue sources based on IP application services, the open nature of the IP infrastructure may put those revenue sources at risk. VoIP is the first, and most prominent of these IP application services. Availability means that the service is there when desired. With voice traveling over an Internet-based network (VoIP), issues such as DoS and distributed DoS attacks represent a significant threat to the availability of the services. DoS may be attempts to disable the functionality of a target, as opposed to gaining operational control of the target. As such, DoS attacks may be more difficult to defend against than traditional invasive exploits. There are already known SIP-based signaling attacks against VoIP, and the protocol itself may be vulnerable to software exploits and persistent protocol transactions that degrade its performance.

There may be three basic types of DoS attacks that might occur over a VoIP network: (1) exploiting implementation flaws (e.g., ping-of-death attack, invalid call setup messages, invalid media, malformed signaling, etc.); (2) exploiting application level vulnerability (e.g., registration hijacking, call hijacking, modify media sessions, session teardown, amplification attacks, media stream attacks, etc.); and (3) flooding (e.g., SIP channel flooding, RTP channel flooding, etc.). These attacks may target a VoIP component, such as a SIP proxy, or a supporting server, such as a Domain Name System (DNS) server, a Directory server, or a Dynamic Host Configuration Protocol (DHCP) server. A DoS attack against a supporting server could affect the VoIP service in different ways. For example, an attack against a certain domain's DNS server could deny VoIP calls destined to users in that domain. Another example could be an attack against a Directory Service, which is used by a SIP proxy server to store address-of-record to UA mappings, and could result in Denial-of-Service to the UAs that registers to this proxy.

BRIEF DESCRIPTION OF THE DRAWINGS

FIG. 8 is an exemplary diagram of a SIP non-INVITE server transaction;

FIG. 9 is an exemplary diagram of a SIP INVITE client transaction;

FIG. 10 is an exemplary diagram of a SIP non-INVITE client transaction;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may detect and prevent DoS attacks on SIP-based systems. For example, the systems and methods may be capable of distinguishing between valid traffic and DoS attack traffic, may differentiate between attacking packets and legitimate ones by comparing current traffic with a nominal traffic profile, may recognize when a DoS attack has been initiated, and may determine the form of the DoS attack. The systems and methods may also prevent a DoS attack from impacting the performance of a targeted VoIP infrastructure component (e.g., a SIP proxy) by employing packet filtering, rate limiting and message manipulation techniques. The systems and methods may use network calling patterns to determine baselines and "learning" to determine action to be taken on questionable packets. The systems and methods may use statistical analysis and application layer (i.e., layer 7 of the Open System Interconnection (OSI) model) inspection and analysis for detection of attacks. The systems and methods may further maintain adequate bandwidth for known, good calls, may monitor packets lost during analysis, may drop malicious packets and throttle streams, and/or may monitor for and drop illegitimate packets.

Figure 1:
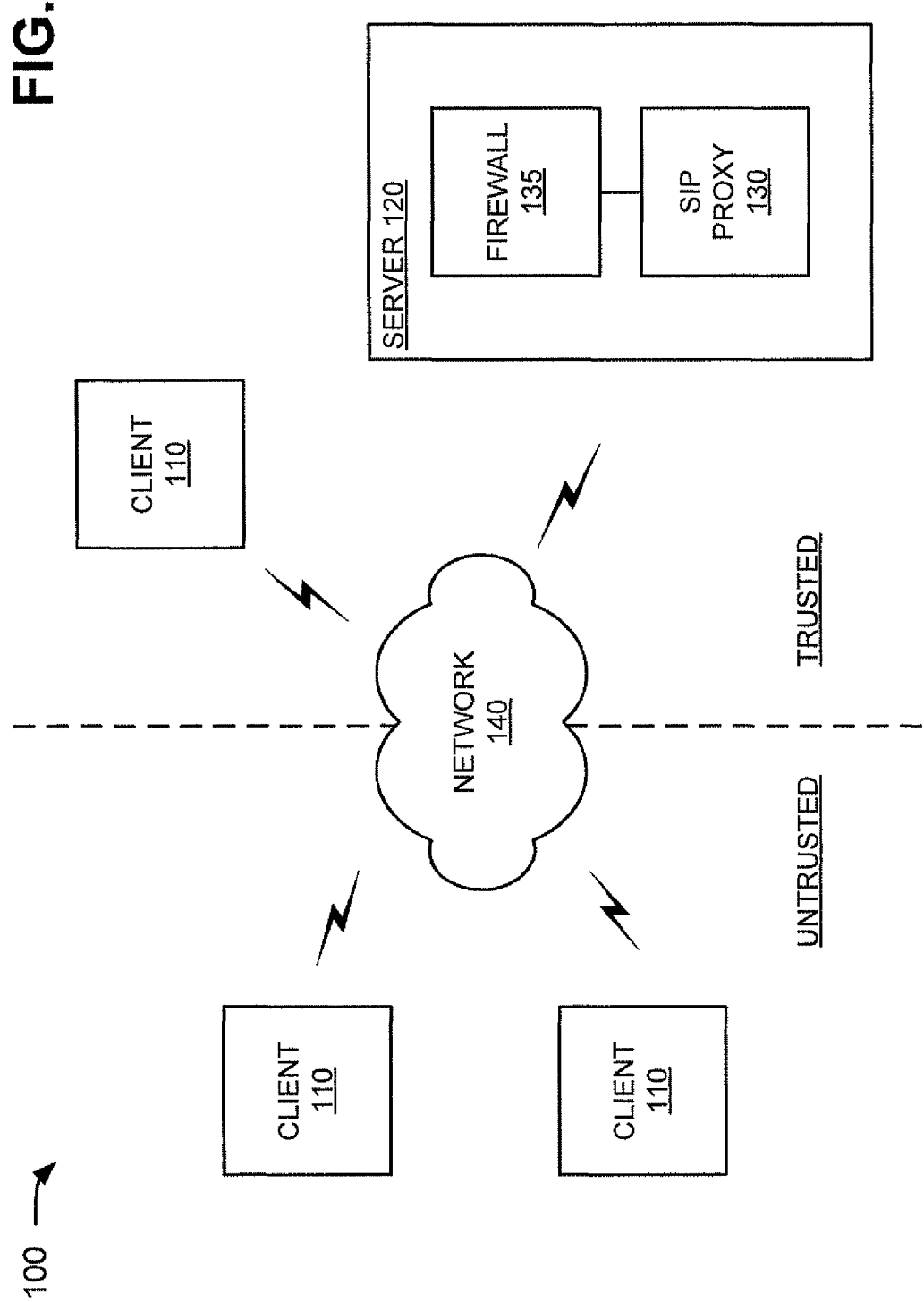
FIG. 1 depicts an exemplary network in which systems and methods described herein may be implemented.

FIG. 1 depicts an exemplary network 100 in which systems and methods described herein may be implemented. Network 100 may include multiple clients 110 connected to multiple servers (e.g., a server 120) via a network 140. Two clients 110 and one server 120 have been illustrated as connected to network 140 for simplicity. In practice, there may be more or fewer clients and servers. Also, in some instances, a client may perform one or more functions of a server and/or a server may perform one or more functions of a client.

Network 140 may include a local area network (LAN), a wide area network (WAN), a telephone network, such as the Public Switched Telephone Network (PSTN), an intranet, the Internet, a SIP-based network, a VoIP-based network, an IVR-based network, or a combination of networks. Clients 110 and server 120 may connect to network 140 via wired, wireless, and/or optical connections.

Clients 110 may include client entities. An entity may be defined as a device, such as a personal computer, a SIP telephone, a wireless telephone, a personal digital assistant (PDA), a lap top, or another type of computation or communication device, a thread or process running on one of these devices, and/or an object executable by one of these devices.

Server 120, also commonly referred to as a network server, may include a device that facilitates the establishment of SIP calls, or a device that is capable of facilitating SIP-based communications, e.g., Internet-based telephone calls, multimedia distribution, multimedia conferences, instant messaging conferences, interactive voice response (IVR), automated and manual operator services, automatic call distribution, call routing, etc.

Server 120 may include a server entity that gathers, processes, searches, and/or maintains applications (e.g., a high-speed, high-capacity packet processing applications server). As further shown in FIG. 1, server 120 may include a SIP proxy 130 and a firewall 135. SIP proxy 130 may include a device that facilitates the establishment of SIP calls. As described in the Internet Engineering Task Force (IETF) document RFC 3261, server 120 may act as both a server and a client for the purpose of making requests on behalf of other clients. Requests may be serviced internally or by passing them on, possibly after translation, to other servers. Server 120 may interpret, and, if necessary, rewrite a request message before forwarding it.

Firewall 135 may include a device which may be configured to permit, deny, and/or proxy data connections set and configured to prevent, e.g., DoS attacks. Firewall 135 may be hardware and/or software based. A basic task of firewall 135 may be to control traffic between devices (e.g., clients 110) of network 140 with different zones of trust. For example, as shown in FIG. 1, two clients 110 (to the left in FIG. 1) may reside in an untrusted or not trusted zone (e.g. the Internet), whereas client 10 (to the right in FIG. 1) and server 120 may reside in a trusted zone (e.g., an internal network). Firewall 135 may provide a controlled interface between zones of differing trust levels through the enforcement of a security policy and connectivity model based on the least privilege principle and separation of duties. In one implementation, firewall 135 may operate on data on behalf of an organizational network (e.g., a private network) and may prevent DoS attacks from untrusted sources. For example, firewall 135 may receive all, or substantially all, data destined for server 120 or trusted client 110 and/or transmitted by server 120 or trusted client 110.

The systems and methods described herein may utilize a deep-packet inspection filtering device (e.g., firewall 135), which may be deployed at the network perimeter, and may be capable of both detecting and filtering DoS attack attempts at carrier-class. Firewall 135 may include a high speed database using content addressable memory (CAM) technology for state table(s) storage. Firewall 135 may also utilize a Firewall Control Protocol (FCP) to update the state table(s) in firewall 135. Firewall 135 may further utilize packet logic manipulation that may be used to update the CAM state table(s).

Although FIG. 1 shows SIP proxy 130 as part of server 120, in other implementations, SIP proxy 130 may be a separate server entity that includes a device that facilitates the establishment of SIP calls, e.g., as described in RFC 3261. Furthermore, although FIG. 1 shows firewall 135 as part of server 120, in other implementations, firewall 135 may be a separate entity that includes a device which may be configured to permit, deny, and/or proxy data connections set and configured to prevent, e.g., DoS attacks. In still other implementations, firewall 135 may perform the functions of SIP proxy 130, or SIP proxy 130 may perform the functions of firewall 135.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as clients 110, connected to a network. Although SIP-type messages are shown for convenience, any type of protocol or a mixture of such protocols may be applied in various parts of the overall system.

Furthermore, in one implementation, firewall 135 may include the features set forth in co-pending application Ser. No. 11/557,703, entitled "SYSTEMS AND METHODS FOR IMPLEMENTING A PROTOCOL-AWARE NETWORK FIREWALL," filed on Nov. 8, 2006 the same date herewith, the disclosure of which is incorporated by reference herein in its entirety. In another implementation, firewall 135 may include the features set forth in co-pending application Ser. No. 11/557,740, entitled "PREVENTION OF DENIAL OF SERVICE (DoS) ATTACKS ON SESSION INITIATION PROTOCOL (SIP)-BASED SYSTEMS USING RETURN ROUTABILITY CHECK FILTERING," filed on Nov. 8, 2006, the disclosure of which is incorporated by reference herein in its entirety.

Figure 2:
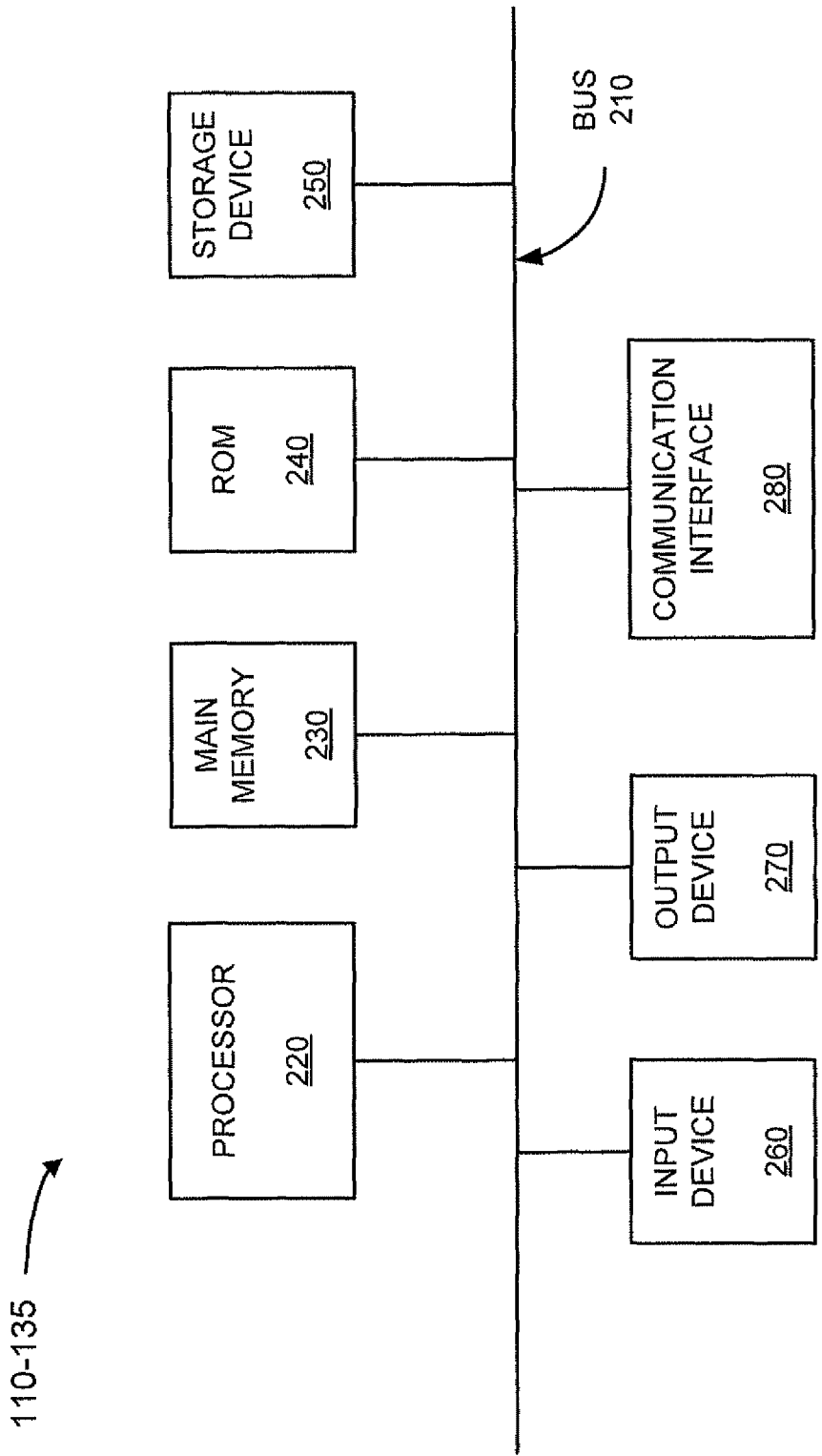
FIG. 2 depicts an exemplary device, client or server, configured to communicate via the exemplary network illustrated in FIG. 1.

FIG. 2 is an exemplary diagram of a client or server entity (hereinafter called "client/server entity"), which may correspond to one or more of clients 110, server 120, SIP proxy 130, and/or firewall 135. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain DoS detection and prevention operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

It may typically require many more resources to generate a flooding DOS attack than other DoS attacks. Flooding an access link may include hundreds or thousands of simultaneous individual streams coming from multiple machines geographically dispersed. As a preliminary step, the DoS attacker may need to take control over remote machines that can later be used to generate the attack. This preliminary attack may be accomplished using a worm or a Trojan horse. The machines comprised by a flooding DoS attack may be referred to as "zombies" or "bots," and their collection may form a "botnet." On the contrary, an implementation flaw DoS attack may utilize a single specially crafted packet, as in the case of the ping-of-death DOS attack.

Thus, it may be easier to defend against implementation flaw attacks since these attacks may use common attributes to exploit a software weakness. Application level and flooding attacks, on the other hand, may be more difficult to defend against when protecting SIP devices. Flooding attacks may be especially difficult because even the best-maintained system may become congested, thus denying service to legitimate users. The challenge is to distinguish between legitimate and malicious traffic and then prevent the malicious traffic from flooding the victim.

Given the diversity and broad range of attack methodologies, the systems and methods described herein focus on specific method (i.e., SIP Method) vulnerabilities that may be used by attackers for launching DoS attacks. A "method vulnerability," as the term is used herein, is to be broadly interpreted to include any SIP Method vulnerability described above, and/or any other SIP Method vulnerability. A "SIP Method," as the term is used herein, is to be broadly interpreted to include any SIP function that may execute a SIP request and may include a set of expected responses within a SIP transaction (e.g., a SIP INVITE as SIP Method to begin a call). Specifically, the systems and methods may detect and prevent lack of identity assurance-related vulnerabilities. An "identity," as the term is used herein, is to be broadly interpreted to include any end-point's source IP address. Many of the attacks described above may spoof the identity of the end users that originate SIP requests. A common vulnerability to SIP over User Datagram Protocol (UDP) may be the ability to spoof SIP requests resulting in several vulnerabilities (e.g., SIP spoof attacks, registration/call hijacking, session teardown, request flooding, error message flooding, SIP method vulnerabilities, etc.).

Figure 3:
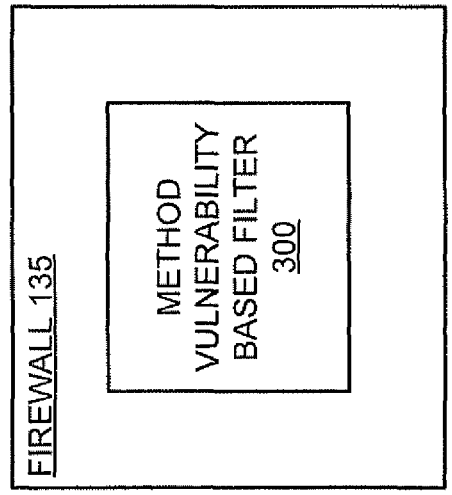
FIG. 3 is a diagram of exemplary components of a firewall of the exemplary server illustrated in FIG. 1.

To defend against the above vulnerabilities, firewall 135 may provide, as shown in FIG. 3, one type of rule-based detection and prevention (or mitigation) filters, i.e., a method (e.g., a SIP Method) vulnerability based filter 300. Generally, for transaction based attacks, method vulnerability based filter 300 may provide a threshold of message rates (e.g., INVITE, errors, etc.). For state machine sequencing, method vulnerability based filter 300 may filter "out-of-state" messages, and may allow "in-state" messages. For dialog based attacks, method vulnerability based filter 300 may maintain a database of INVITE sources to verify and accept a BYE or CANCEL message only from legitimate source addresses. Method vulnerability based filter 300 may generally defend against specific method vulnerabilities. Detailed descriptions of the operations of method vulnerability based filter 300 are provided below.

Although FIG. 3 shows exemplary components of firewall 135, in other implementations firewall 135 may contain additional components that may permit detection and prevention of DoS attacks.

Figure 4:
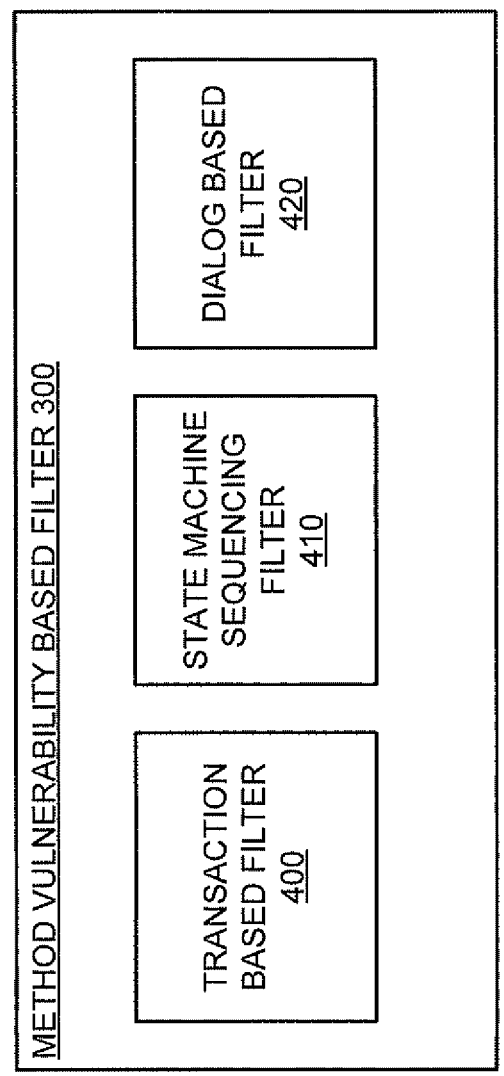
FIG. 4 is an exemplary diagram of a method vulnerability filter of the firewall illustrated in FIG. 3.

FIG. 4 is an exemplary diagram of method vulnerability based filter 300 of firewall 135. As shown, method vulnerability based filter 300 may include a transaction based filter 400, a state machine sequencing filter 410, and a dialog based filter 420. SIP sessions and/or calls may be broken down into four levels of granularity. For example, a SIP call may contain one or more dialogs, and each dialog may contain one or more transactions. Transactions may include a client transaction and a server transaction. Client and server transactions may be further subdivided into INVITE transactions and non-INVITE transactions. Thus, transaction based filter 400 may perform filtering on a transaction basis, state machine sequencing filter 410 may filter "out-of-state" messages, and dialog based filter 420 may perform filtering on a dialog basis. Additional details regarding transaction based filter 400, state machine sequencing filter 410, and dialog based filter 420 are provided below with respect to FIGS. 5-12.

Method vulnerability based filter 300 may be applied at the dialog level and at the transaction level. A dialog may be identified completely by method vulnerability based filter 300 as a peer-to-peer SIP relationship by a combination of a "Call-ID" field (which may contain a globally unique identifier for a call generated by the combination of a random string and client's 10 host name or IP address), a "From" tag, and a "To" tag. A transaction may be identified by method vulnerability based filter 300 from a "Branch" parameter of a "Via" header (which may be used to identify the transaction created by a particular request, and may be used by both a client and a server), and from a "Method" name in a CSeq field (which may be the primary function that a request is meant to invoke on a server, and may be carried in the request message itself, e.g., INVITE and BYE request).

Method vulnerability based filter 300 may use the aforementioned fields to construct a Dialog-ID and a Transaction-ID that may, in turn, be used to maintain corresponding state information. The Dialog-ID and Transaction-ID may be of variable length. In order to generate a fixed length index in the CAM tables of firewall 135, a CRC-32 hash algorithm may be applied on a collection of the aforementioned fields to generate a unique CRC-32 hash that may be used as an index in the CAM tables for state keeping.

Although FIG. 4 shows exemplary components of method vulnerability based filter 300, in other implementations method vulnerability based filter 300 may contain fewer or additional components that may permit detection and prevention of DoS attacks. In still other implementations, one or more components of method vulnerability based filter 300 may perform the tasks performed by other components of method vulnerability based filter 300.

Figure 5:
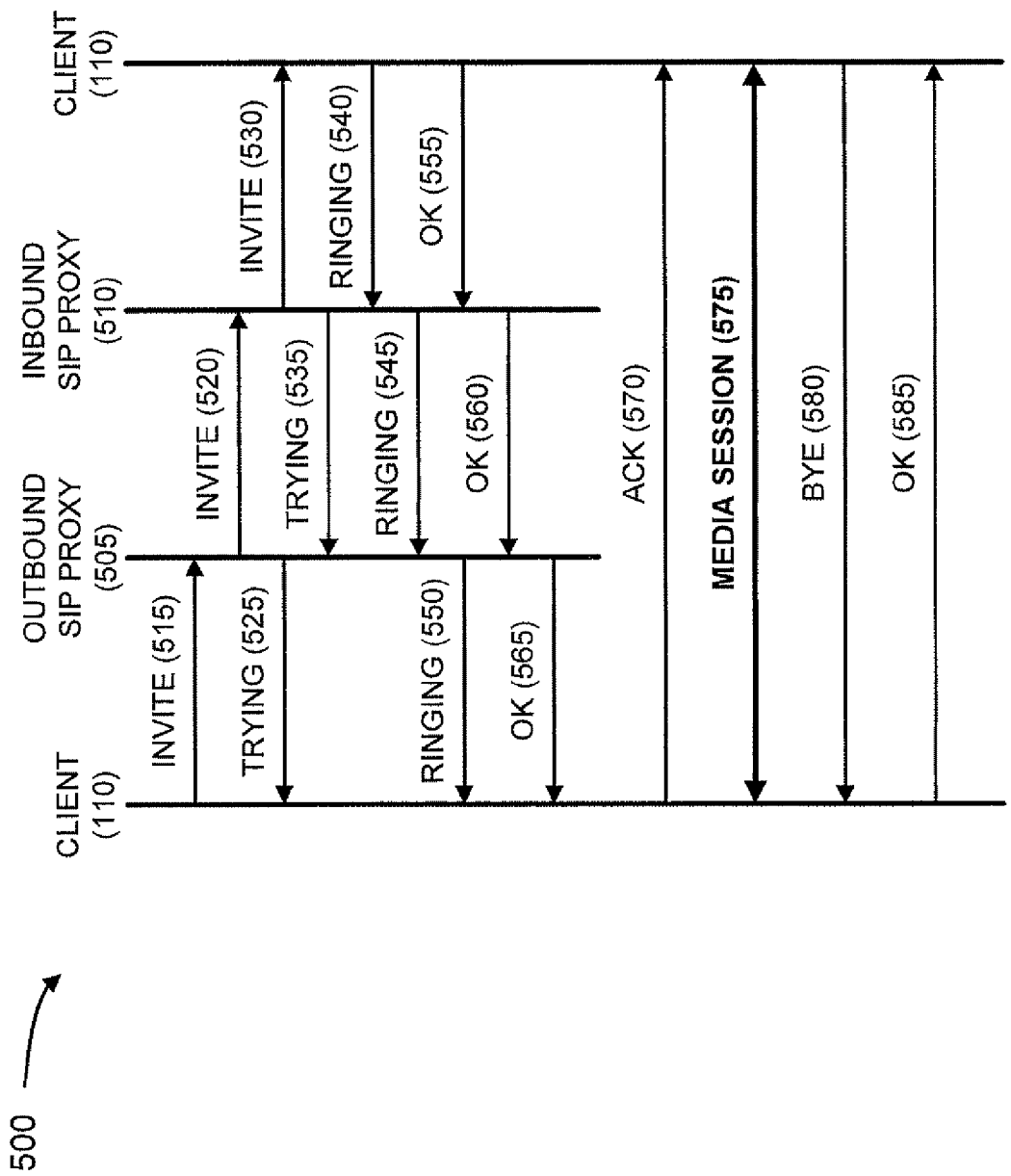
FIG. 5 is an exemplary call flow diagram between two clients and two SIP proxies.
Figure 6:
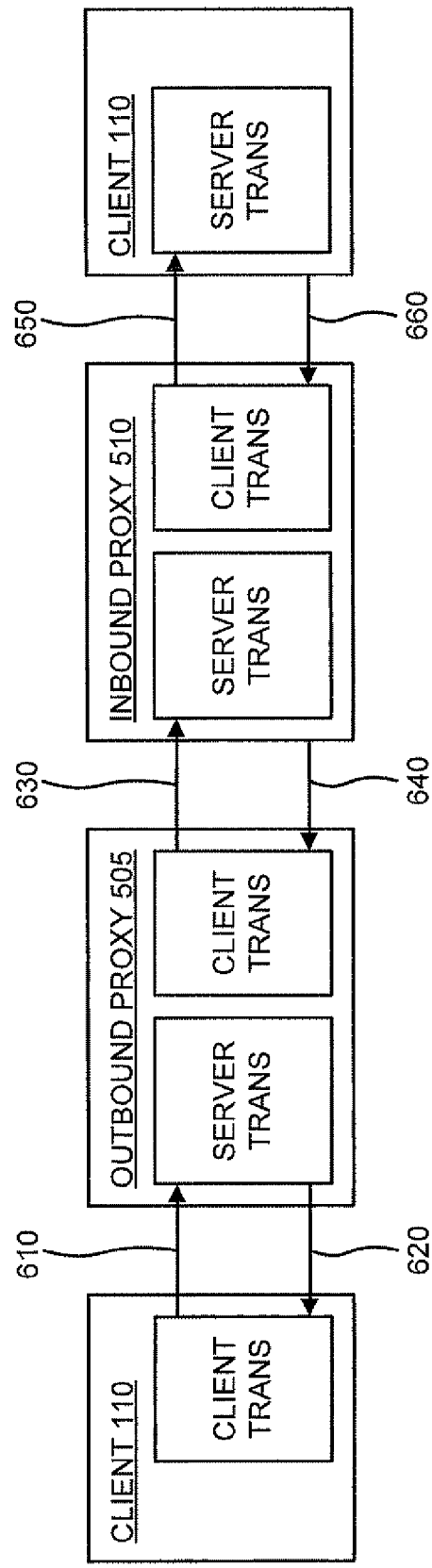
FIG. 6 is an exemplary diagram of SIP client and server interactions through inbound and outbound proxies.

FIG. 5 is an exemplary call flow 500 between two clients 10, an outbound SIP proxy 505, and inbound SIP proxy 510. FIG. 6 is an exemplary diagram showing the interactions of the two clients 110, outbound SIP proxy 505, and inbound SIP proxy 510 of FIG. 5. Outbound SIP proxy 505 and inbound SIP proxy 510 may include all of the components and functionalities of server 120, SIP proxy 130, and/or firewall 135 depicted in FIG. 1.

As shown in FIG. 5, the leftmost client 110 may initiate a SIP INVITE request 515 to outbound SIP proxy 505. Outbound SIP proxy 505 may send a SIP INVITE request 520 to inbound SIP proxy 510, and may send a TRYING message 525 to leftmost client 110. Inbound SIP proxy 510 may send a SIP INVITE request 530 to rightmost client 110, and may send a TRYING message 535 (e.g., a "100" message) to outbound SIP proxy 505. Rightmost client 110 may send a RINGING message 540 (e.g. a "180" message) to inbound SIP proxy 510, inbound SIP proxy 510 may send a RINGING message 545 to outbound SIP proxy 505, and outbound SIP proxy 505 may send a RINGING message 550 to leftmost client 110. If rightmost client 110 is available and accepts the call, rightmost client 110 may send an OK message 555 (e.g., a "200" message) to inbound SIP proxy 510. Inbound SIP proxy 510 may send an OK message 560 to outbound SIP proxy 505, and outbound SIP proxy 505 may send an OK message 565 to leftmost client 110. Leftmost client 110 may send an ACK message 570 to rightmost client 110, and a media session 575 may be established between the two clients. If media session 575 is terminated by rightmost client 110, rightmost client 110 may send a BYE message 580 to leftmost client 110, and leftmost client 110 may return an OK message 585 to rightmost client 110.

Call flow diagram 500 may be further depicted by an interaction diagram 600 depicted in FIG. 6. As shown, leftmost client 110 may include a client transaction component that sends a request 610 (e.g., SIP INVITE request 515) to a server transaction component of outbound SIP proxy 505. The client transaction component of leftmost client 110 may receive responses 620 (e.g., TRYING message 525, RINGING message 550, OK message 565, etc.) from the server transaction component of outbound SIP proxy 505. From the perspective of outbound SIP proxy 505, request 610 and responses 620 may be deemed an INVITE SERVER transaction. Transaction based filter 400 may infer that an INVITE SERVER transaction may include a single incoming INVITE (e.g., SIP INVITE request 515) and outgoing messages (e.g., TRYING message 525, RINGING message 550, OK message 565, etc.). Transaction based filter 400 may thus rate limit the messages involved in the INVITE SERVER transaction to one INVITE transaction (e.g., incoming), one or more TRYING transaction(s) (e.g., outgoing), one or more RINGING transaction(s) (e.g., outgoing), and one OK transaction (e.g., outgoing). Transaction based filter 400 may filter arbitrary messages that do not conform to the rate limits established for the INVITE SERVER transaction. Thus, transaction based filter 400 may prevent a DoS attacker from amplifying a message rate and flooding a SIP proxy by playing man-in-the-middle, and may prevent a DoS attacker from sending false response messages (e.g., responses 620) to a client.

As further shown in FIG. 6, outbound SIP proxy 505 may include a client transaction component that sends a request 630 (e.g., SIP INVITE request 520) to a server transaction component of inbound proxy server 510. The client transaction component of outbound SIP proxy 505 may receive responses 640 (e.g., TRYING message 535, RINGING message 545, OK message 560, etc.) from the server transaction component of inbound SIP proxy 510. From the perspective of outbound SIP proxy 505, request 630 and responses 640 may be deemed an INVITE CLIENT transaction. Transaction based filter 400 may infer that an INVITE CLIENT transaction may include a single outgoing INVITE (e.g., SIP INVITE request 520) and incoming messages (e.g., TRYING message 535, RINGING message 545, OK message 560, etc.). With regard to outbound proxy 505, transaction based filter 400 may thus rate limit the messages involved in the INVITE CLIENT transaction to one INVITE transaction (e.g., outgoing), one TRYING transaction (e.g., outgoing), one RINGING transaction (e.g., outgoing), and one OK transaction (e.g., outgoing). Transaction based filter 400 may filter arbitrary messages that do not conform to the rate limits established for the INVITE CLIENT transaction. Thus, transaction based filter 400 may prevent a DoS attacker from amplifying a message rate and flooding a SIP proxy by playing man-in-the-middle, may prevent a DoS attacker from sending false response messages (e.g., responses 640) to a SIP proxy, and may prevent a DoS attacker from sending INVITEs at a very high rate by sniffing and spoofing packets.

With regard to inbound SIP proxy 510, transaction based filter 400 may rate limit messages involved in the INVITE CLIENT transaction in a manner similar to the manner that transaction based filter 400 rate limits messages involved in the INVITE SERVER transaction, as described above.

As further shown in FIG. 6, inbound SIP proxy 510 may include a client transaction component that sends a request 650 (e.g., SIP INVITE request 530) to a server transaction component of rightmost client 110. The client transaction component of inbound SIP proxy 510 may receive responses 660 (e.g., RINGING message 540, OK message 555, etc.) from the server transaction component of rightmost client 110. From the perspective of inbound SIP proxy 510, request 650 and responses 660 may be deemed an INVITE CLIENT transaction. With regard to inbound SIP proxy 510, transaction based filter 400 may rate limit messages involved in the INVITE CLIENT transaction in a manner similar to the manner that transaction based filter 400 rate limits messages involved in the INVITE CLIENT transaction described above.

Figure 11A:
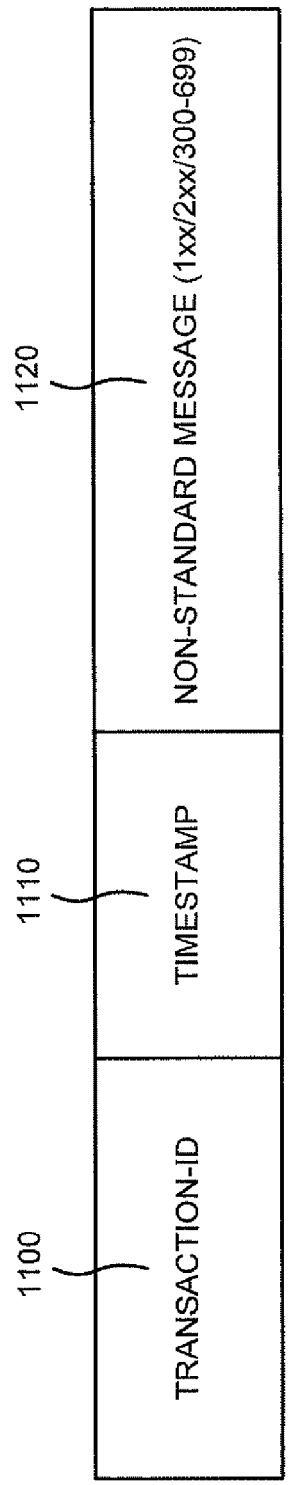
FIGS. 11A and 11B are exemplary diagrams of content addressable memory (CAM) tables provided in the firewall illustrated in FIG. 3.

Transaction based filter 400 of method vulnerability based filter 300 may employ generic rate limiting rules, e.g., rate limiting non-standard "1xx" messages (except "100" and "180" messages), rate limiting non-standard "2xx" messages (except "200" messages), or rate limiting "300-699" responses (e.g., to ten per second). Such rate limiting may eliminate specific handling for each of the messages in the range. Transaction based filter 400 may perform such rate limiting by maintaining a CAM table that includes a "Transaction-ID" field 1100, a "Timestamp" field 1110, and a "Non-standard message (1xx/2xx/300-699)" field 1120, as shown in FIG. 11A, and rejecting non-standard messages once the number of elements (e.g., rows) of the table of FIG.

11A reaches a predetermined number (e.g., ten per second). Transaction based filter 400 may verify the validity of an INVITE request by checking Transaction-ID field 1100, and rejecting the INVITE request if the Transaction-ID already exists. This may be accomplished by transaction based filter 400 looking up the Transaction-ID of every new INVITE request in Transaction-ID field 1100 and rejecting the request if the Transaction-ID exists in Transaction-ID field 1100.

Figure 11B:
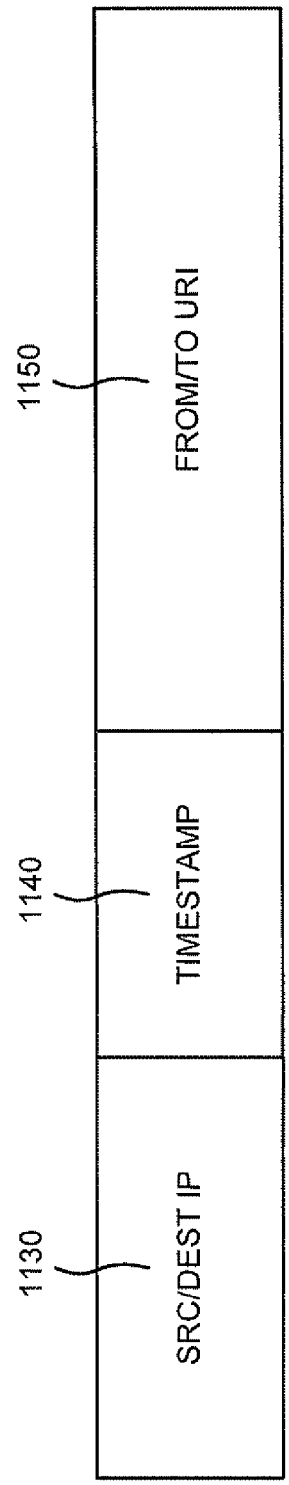

Transaction based filter 400 may rate limit the INVITE requests coming from a single source IP address and an identical "From URI incase" of an outbound proxy, and may rate limit INVITE requests coming to a single destination IP and a "To URI incase" of an inbound proxy. Transaction based filter 400 may accomplish this by maintaining a CAM table that includes a source/destination "SRC/DEST IP" field 1130, a "Timestamp" field 1140, and a "From/To URI" field 1150, as shown in FIG. 11B. Transaction based filter 400 may determine whether a Timestamp difference between a new INVITE request and an identical INVITE in the CAM table is greater than a predetermined time (e.g., one second), and, if the Timestamp difference is less than the predetermined time, may reject the INVITE request.

State machine sequencing filter 410 of firewall 135 may filter based on transaction state machines. In one implementation, state machine sequencing filter 410 may be considered a transaction based filter similar to transaction based filter 400. FIGS. 7-10 depict exemplary transaction state machines for a SIP INVITE server transaction 700, a SIP non-INVITE server transaction 800, a SIP INVITE client transaction 900, and a SIP non-INVITE client transaction 1000, respectively.

Figure 7:
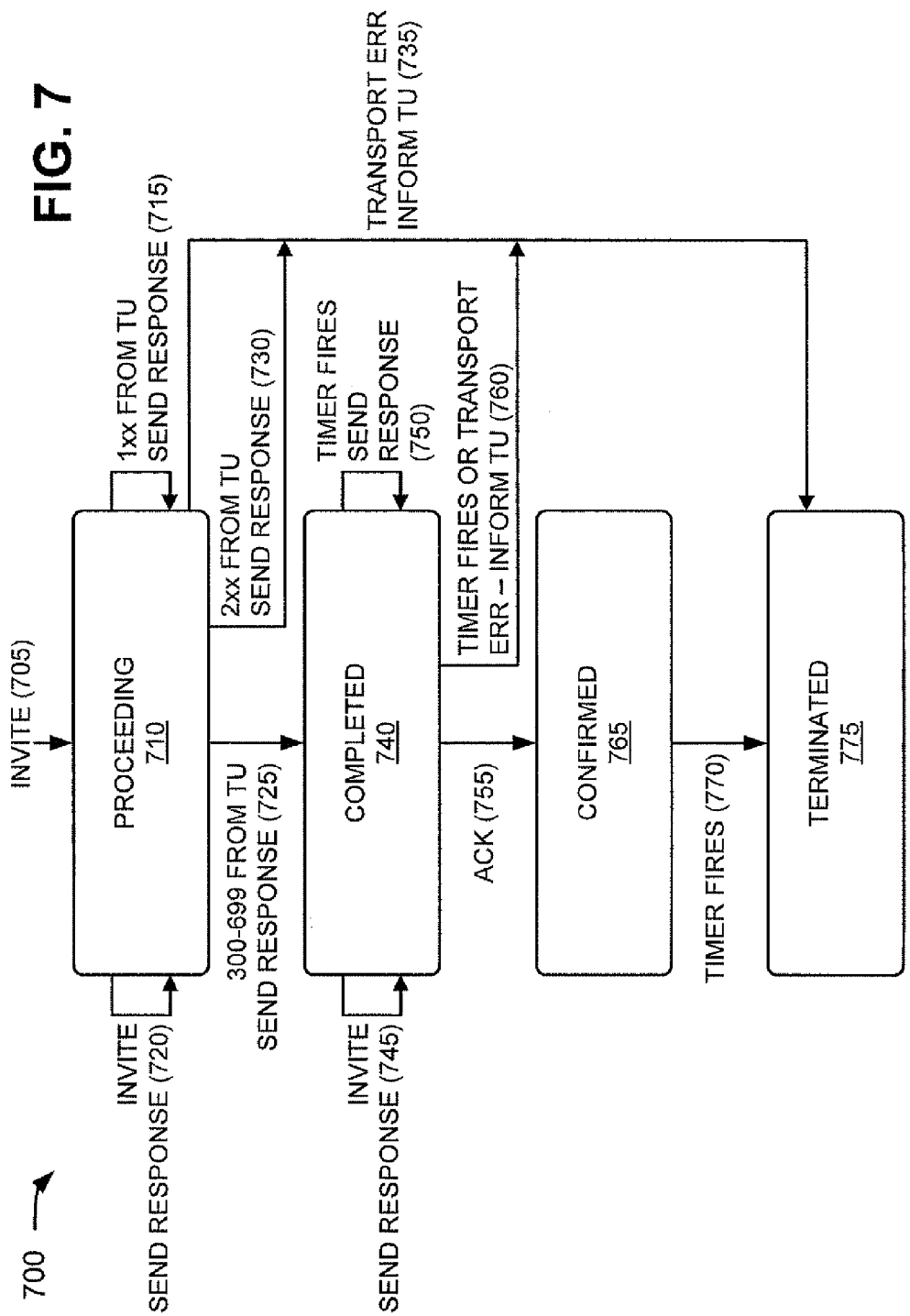
FIG. 7 is an exemplary diagram of a SIP INVITE server transaction.

As shown in FIG. 7, an INVITE 705 may be received during a proceeding state 710. If a "1xx" message is received from a transaction user (TU) in proceeding state 710, a corresponding response 715 may be generated. If INVITE 705 was forwarded in proceeding state 710, a corresponding response 720 may be generated. If "300-699" messages are received from the TU, a corresponding response 725 may be generated and SIP INVITE server transaction 700 may enter a completed state 740. If a "2xx" message is received from the TU, a corresponding response 730 may be generated and SIP INVITE server transaction 700 may enter a terminated state 775. If a transport error message is received, a response 735 informing the TU may be generated and SIP INVITE server transaction 700 may enter terminated state 775. If INVITE 705 was forwarded in completed state 740, a corresponding response 745 may be generated. If a first timer fires or expires in completed state 740, a corresponding response 750 may be generated. It an ACK message 755 is received, SIP INVITE server transaction may enter a confirmed state 765. If a second timer fires (or expires) or a transport error is received, a response 760 informing the TU may be generated and SIP INVITE server transaction 700 may enter terminated state 775. If a third timer fires or expires 770, SIP INVITE server transaction 700 may enter terminated state 775.

State machine sequencing filter 410 may maintain a state (e.g., CAM) table for SIP INVITE server transaction 700 that includes proceeding state 710, completed state 740, confirmed state 765, and terminated state 775. The state (CAM) table may accept standard messages (e.g., TRYING, RINGING, and/or OK messages) to increment state.

As shown in FIG. 8, a request 805 may be received and passed to a TU during a trying state 810. If a "1xx" message is received from the TU, a corresponding response 815 may be generated and SIP non-INVITE server transaction 800 may enter a proceeding state 825. If "200-699" messages are received from the TU, a corresponding response 820 may be generated and SIP non-INVITE server transaction 800 may enter a terminated state 865. If a "1xx" message is received from the TU in proceeding state 825, a corresponding response 830 may be generated. If request 805 is forwarded in proceeding state 825, a corresponding response 835 may be generated. If a transport error is received in proceeding state 825 or a completed state 850, a response 840 informing the TU may be generated and SIP non-INVITE server transaction 800 may enter terminated state 865. If "200-699" messages are received from the TU, a corresponding response 845 may be generated and SIP non-INVITE server transaction 800 may enter completed state 850. If request 805 is forwarded in completed state 850, a corresponding response 855 may be generated. If a timer fires or expires 860, SIP non-INVITE server transaction 800 may enter terminated state 865.

State machine sequencing filter 410 may maintain a state (e.g., CAM) table for SIP non-INVITE server transaction 800 that includes trying state 810, proceeding state 825, completed state 850, and terminated state 865. The state (CAM) table may accept standard messages (e.g., TRYING, RINGING, and/or OK messages) to increment state. State machine sequencing filter 410 may provide generic handling of "1xx" and "200-699" messages to increment state.

As shown in FIG. 9, an INVITE 905 may be received from the TU and sent during a calling state 910. If a first timer fires or expires in calling state 910, the first timer may be reset and an INVITE 915 may be sent. If a second timer fires (or expires) or a transport error is received in calling state 910, a response 920 informing the TU may be generated and SIP INVITE client transaction 900 may proceed to a terminated state 980. If a "1xx" message 925 is sent to the TU, SIP INVITE client transaction 900 may enter a proceeding state 940. If a "2xx" message 930 is sent to the TU in calling state 910, SIP INVITE client transaction 900 may proceed to terminated state 980. If a "300-699" ACK message is sent in calling state 910, a corresponding response 935 may be sent to the TU and SIP INVITE client transaction 900 may proceed to a completed state 960. If a "1xx" message is sent in proceeding state 940, a corresponding response 945 may be generated. If a "2xx" message 950 is sent to the TU in proceeding state 940, SIP INVITE client transaction 900 may proceed to terminated state 980. If a "300-699" ACK message is sent in proceeding state 940, a corresponding response 955 may be sent to the TU and SIP INVITE client transaction 900 may proceed to completed state 960. If a "300-699" ACK message is received in completed state 960, a corresponding response 965 may be generated. If a transport error occurs in completed state 960, a response 970 informing the TU may be generated and SIP INVITE client transaction 900 may proceed to terminated state 980. If a third timer fires or expires 975 in completed state 960, SIP INVITE client transaction 900 may enter terminated state 980.

State machine sequencing filter 410 may maintain a state (e.g., CAM) table for SIP INVITE client transaction 900 that includes calling state 910, proceeding state 940, completed state 960, and terminated state 980. The state (CAM) table may accept standard messages (e.g., TRYING, RINGING, OK, and/or ACK messages) to increment state.

As shown in FIG. 10, a request 1005 may be received and passed to a TU during a trying state 1010. If "200-699" messages are received from the TU, a corresponding response 1015 may be generated and SIP non-INVITE client transaction 1000 may enter a terminated state 1065. If a "1xx" message is received from the TU, a corresponding response 1020 may be generated and SIP non-INVITE client transaction 1000 may enter a proceeding state 1025. If a "1xx" message is received from the TU in proceeding state 1025, a corresponding response 1030 may be generated. If request 1005 is forwarded in proceeding state 1025, a corresponding response 1035 may be generated. If a transport error is received in proceeding state 1025 or a completed state 1050, a response 1040 informing the TU may be generated and SIP non-INVITE client transaction 1000 may enter a terminated state 1065. If "200-699" messages are received from the TU, a corresponding response 1045 may be generated and SIP non-INVITE client transaction 1000 may enter completed state 1050. If request 1005 is forwarded in completed state 1050, a corresponding response 1055 may be generated. If a timer fires or expires 1060, SIP non-INVITE client transaction 1000 may enter terminated state 1065.

State machine sequencing filter 410 may maintain a state (e.g., CAM) table for SIP non-INVITE client transaction 1000 that includes trying state 1010, proceeding state 1025, completed state 1050, and terminated state 1065. The state (CAM) table may accept standard messages (e.g., TRYING, RINGING, and/or OK messages) to increment state. State machine sequencing filter 410 may provide generic handling of "1xx" and "200-699" messages to increment state.

For implementing the above state tables, state machine sequencing filter 410 may maintain the state according to the transaction state machine specified in document RFC 3261 for client and server INVITE and non-INVITE transactions by maintaining a table that includes a "Transaction-ID" field, a "Timestamp" field, a "State" field, an "Acceptable message codes" field, and a "Next State" field. There may be more then one "Next State" field depending on what is received (e.g., NOTIFY in an INVITE dialog). The state tables of state machine sequencing filter 410 may include a start state of the State Machine, legal states with values of acceptable message codes in each state and a corresponding next state for each pair (e.g., current state, acceptable message code, etc.), etc. State machine sequencing filter 410 may allow "in-state" messages and may filter "out-of-state" messages based on the state tables. Further, if an acceptable message is received, state machine sequencing filter 410 may increment the current state to the next legal state and may forward the packet to SIP proxy 130. Thus, state machine sequencing filter 410 may prevent a DoS attacker from sending spoofed "out-of-state" messages.

Figure 12:
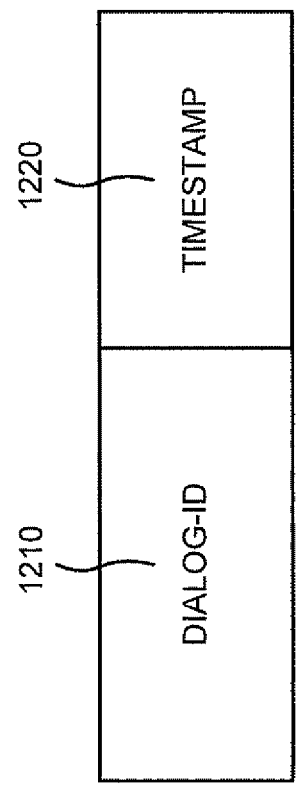
FIG. 12 is an exemplary diagram of a Dialog-ID table provided in the firewall illustrated in FIG. 3.

Dialog based filter 420 may provide dialog level filtering to identify BYE or CANCEL messages. Dialog based filter 420 may use a "Dialog-ID" of a dialog to identify a BYE or CANCEL message, and may reject a BYE or CANCEL message if it is not part of an existing Dialog. Dialog based filter 420 may accomplish such filtering by maintaining a Dialog-ID table 1200, as shown in FIG. 12, that includes a "Dialog-ID" field 1210 and a "Timestamp" field 1220. Dialog based filter 420 may look up the Dialog-ID of an incoming BYE or CANCEL message in Dialog-ID table 1200, and may reject the message if its Dialog-ID is not found in Dialog-ID table 1200.

Returning to FIG. 3, method vulnerability based filter 300 may also defend against specific method vulnerabilities (e.g., an INVITE attack, a BYE attack, a CANCEL attack, a Re-INVITE attack, a REFER attack, etc.). For example, an INVITE attack may be launched by flooding SIP proxy 130 with INVITE requests that contain the same Transaction-ID. Method vulnerability based filter 300 may filter redundant INVITE messages by looking up the INVITE messages Transaction-ID, and rejecting the redundant INVITE messages if the Transaction-ID already exists in the state tables maintained in firewall 135. A BYE attack may be launched if the attacker has sniffing capabilities and can acquire SIP session parameters easily. In addition to filtering BYE messages based on Dialog-ID, method vulnerability based filter 300 may filter BYE attacks by maintaining a table of participating URIs, and verifying whether the contact header field of the BYE message is one of the participating URIs.

In a CANCEL attack, an attacker may be able to generate a CANCEL request before a final response of a transaction. Method vulnerability based filter 300 may verify CANCEL requests using the Transaction and Dialog parameters as set forth above for the BYE attack. However, if an attacker can sniff, the attacker may surpass this verification. Method vulnerability based filter 300 may also employ IP security (IPSec) (i.e., a standardized framework for securing IP communications by encrypting and/or authenticating each IP packet in a data stream) or Transport Layer Security (TLS) (i.e., a cryptographic protocol which provides secure communications on the Internet) to successfully combat a CANCEL attack.

In a Re-INVITE attack, a potential attacker may change Dialog/Session parameters by issuing RE-INVITE or UPDATE messages. Method vulnerability based filter 300 may combat this attack by verifying Re-INVITE requests using a Transaction-ID and/or a Dialog-ID.

In a REFER attack, the referee in a REFER transaction may behave as an eavesdropper and may potentially manipulate the Referred-By header data. Method vulnerability based filter 300 may combat this attack by using Secure/Multipurpose Internet Mail Extensions (S/MIME) (i.e., a standard for public key encryption and signing of e-mail encapsulated in MIME) to enable the REFER target to detect possible manipulation of the Referred-By header data.

Figure 13:
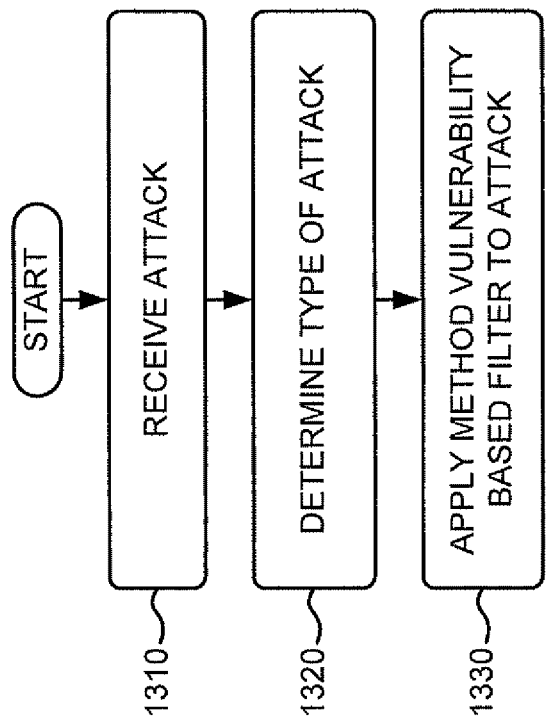
FIGS. 13-14C are flowcharts of exemplary processes according to implementations described herein.
Figure 14A:
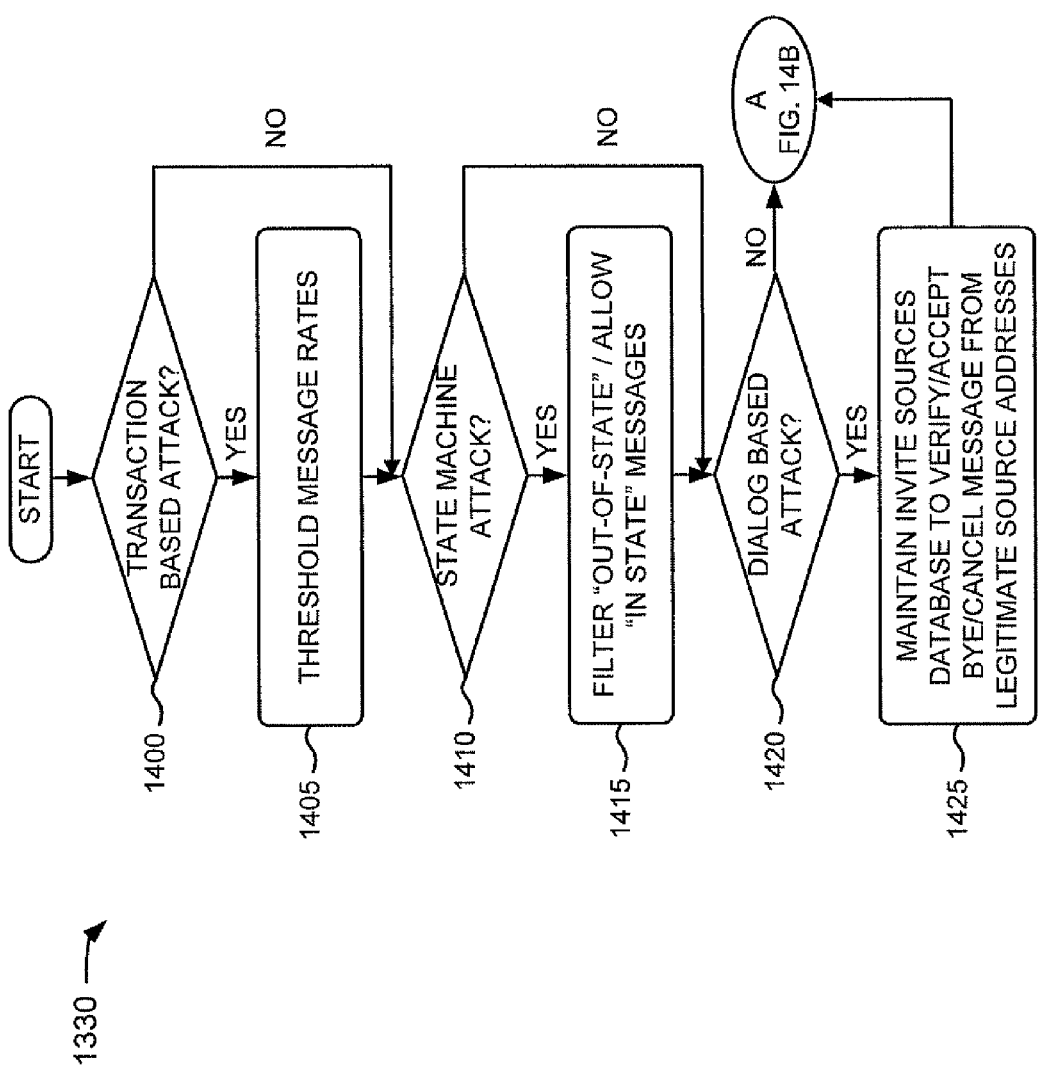
Figure 14B:
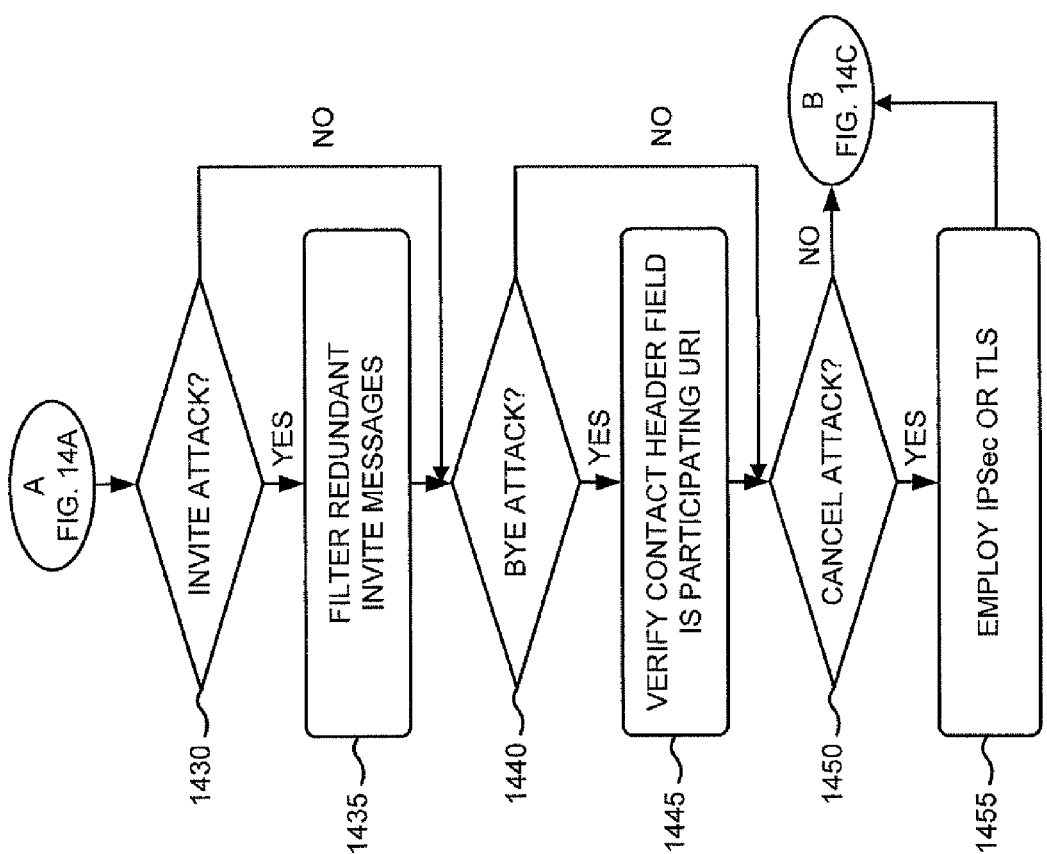
Figure 14C:
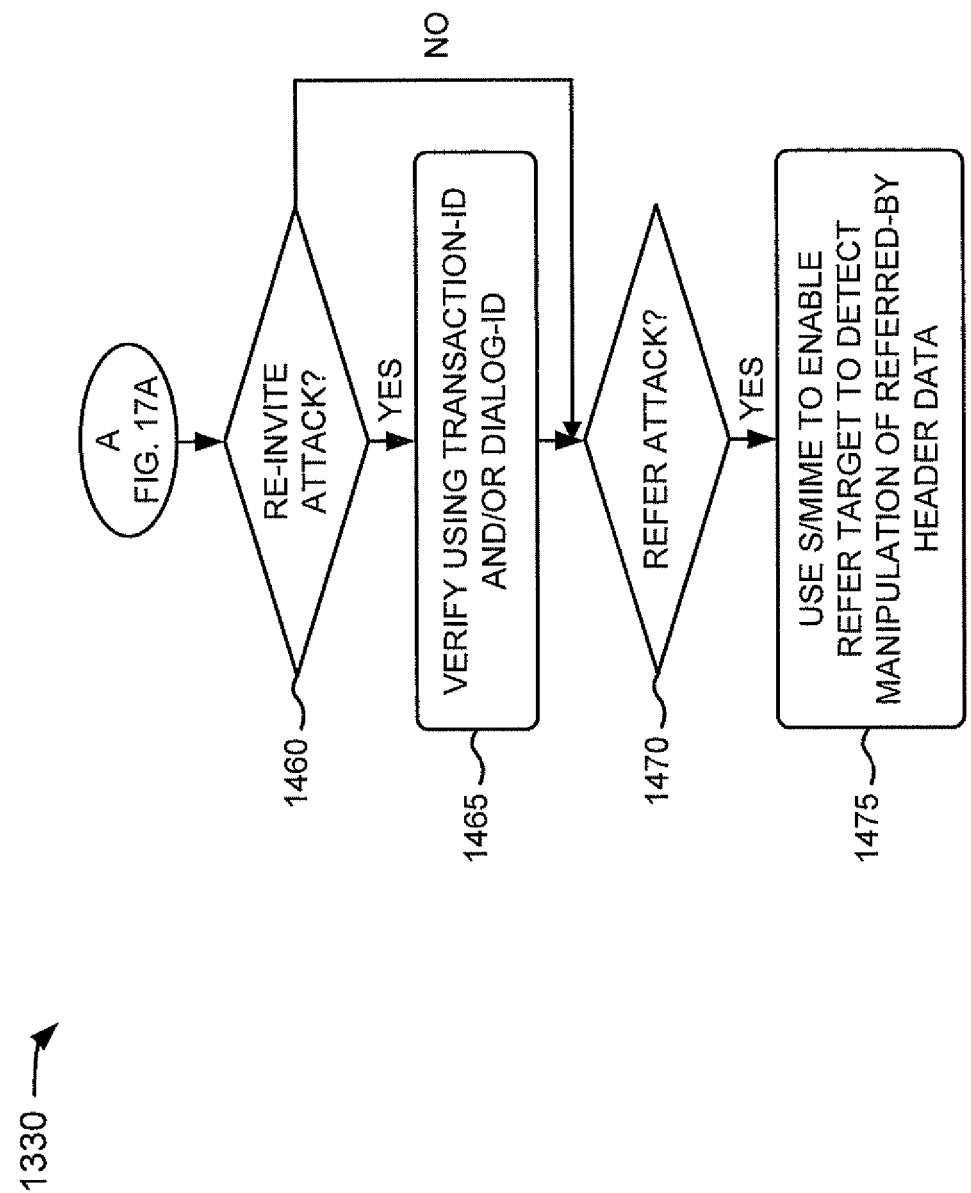

FIGS. 13-14C are flowcharts of exemplary processes capable of being performed by server 120, SIP proxy 130, firewall 135, or combinations of aforementioned devices. As shown in FIG. 13, a process 1300 may receive an attack(s) (block 1310) and may determine a type of attack(s) For example, in one implementation, firewall 135 may receive any of the DoS attacks described above and may determine a type of the attack(s).

Process 1300 may apply a method vulnerability based filter to the attack(s) (block 1330). For example, in one implementation described above in connection with FIG. 3, method vulnerability based filter 300 may provide a threshold of message rates (e.g., INVITE, errors, etc.) for transaction based attacks. For state machine sequencing, method vulnerability based filter 300 may filter "out-of-state" messages, and may allow "in-state" messages. For dialog based attacks, method vulnerability based filter 300 may maintain a database of INVITE sources to verify and accept a BYE or CANCEL message only from legitimate source addresses. In another implementation described above in connection with FIG. 3, method vulnerability based filter 300 may generally defend against specific method vulnerabilities (e.g., an INVITE attack, a BYE attack, a CANCEL attack, a Re-INVITE attack, a REFER attack, etc.).

FIGS. 14A-14C depict the process blocks related to process block 1330 of process 1300. As shown, process block 1330 may determine whether the attack is transaction based (block 1400). If the attack is transaction based (block 1400—YES), process block 1330 may threshold message rates (block 1405). For example, in one implementation described above in connection with FIGS. 4-6, transaction based filter 400 of method vulnerability based filter 300 may rate limit the messages involved in an INVITE SERVER transaction to one INVITE transaction (e.g., incoming), one or more TRYING transaction(s) (e.g., outgoing), one or more RINGING transaction(s) (e.g., outgoing), and one OK transaction (e.g., outgoing). Transaction based filter 400 may filter arbitrary messages that do not conform to the rate limit for the INVITE SERVER transaction. Transaction based filter 400 may also rate limit the messages involved in an INVITE CLIENT transaction to one INVITE transaction (e.g., outgoing), one TRYING transaction (e.g., outgoing), one RINGING transaction (e.g., outgoing), and one OK transaction (e.g., outgoing). Transaction based filter 400 may filter arbitrary messages that do not conform to the rate limit for the INVITE CLIENT transaction. Thus, transaction based filter 400 may prevent a DoS attacker from amplifying a message rate and flooding a SIP proxy by playing man-in-the-middle, may prevent a DoS attacker from sending false response messages to a SIP proxy, and may prevent a DoS attacker from sending INVITEs at a very high rate by sniffing and spoofing packets.

If the attack is not transaction based (block 1400—NO) or message rates were thresholded (block 1405), process block 1330 may determine whether the attack is a state machine attack (block 1410). If the attack is a state machine attack (block 1410—YES), process block 1330 may filter out-of-state messages and/or may allow in state messages (block 1415). For example, in one implementation described above in connection with FIGS. 4 and 7-10, state machine sequencing filter 410 may maintain the state according to the transaction state machine specified in document RFC 3261 for client and server INVITE and non-INVITE transactions by maintaining a table that includes a "Transaction-ID" field, a "Timestamp" field, a "State" field, an "Acceptable message codes" field, and a "Next State" field. The state tables of state machine sequencing filter 410 may include a start state of the State Machine, legal states with values of acceptable message codes in each state and a corresponding next state for each pair (e.g., current state, acceptable message code, etc.), etc. State machine sequencing filter 410 may allow "in-state" messages and may filter "out-of-state" messages based on the state tables. If an acceptable message is received, state machine sequencing filter 410 may increment the current state to the next legal state and may forward the packet to SIP proxy 130. Thus, state machine sequencing filter 410 may prevent a DoS attacker from sending spoofed "out-of-state" messages.

If the attack was not a state machine attack (block 1410—NO) or out-of-state messages were filtered and/or in state messages were allowed (block 1415), process block 1330 may determine whether the attack was dialog based (block 1420). If the attack is a dialog based attack (block 1420—YES), process block 1330 may maintain an invite sources database in order to verify and/or accept a BYE or CANCEL message only from legitimate source addresses (block 1425). For example, in one implementation described above in connection with FIGS. 4 and 12, dialog based filter 420 may provide dialog level filtering to identify BYE or CANCEL messages. Dialog based filter 420 may use a "Dialog-ID" of a dialog to identify a BYE or CANCEL message, and may reject a BYE or CANCEL message if it is not part of an existing Dialog. Dialog based filter 420 may accomplish such filtering by maintaining Dialog-ID table 1200, as shown in FIG. 12. Dialog based filter 420 may look up the Dialog-ID of an incoming BYE or CANCEL message in Dialog-ID table 1200, and may reject the message if its Dialog-ID is not found in Dialog-ID table 1200.

Process block 1330 may continue to "A" of FIG. 14B and if it determines that the attack is an INVITE attack (block 1430—YES), process block 1330 may filter redundant INVITE messages (block 1435). For example, in one implementation described above in connection with FIG. 3, if the attack is an INVITE attack, method vulnerability based filter 300 may filter redundant INVITE messages by looking up the INVITE messages Transaction-ID, and rejecting the redundant INVITE messages if the Transaction-ID already exists in the state tables maintained in firewall 135.

If the attack was not an INVITE attack (block 1430—NO) or redundant INVITE messages were filtered (block 1435), process block 1330 may determine if the attack is a BYE attack (block 1440). If the attack is a BYE attack (block 1440—YES), process block 1330 may verify that a contact header field is a participating URI (block 1445). For example, in one implementation described above in connection with FIG. 3, if the attack is a BYE attack, method vulnerability based filter 300 may filter BYE attacks by maintaining a table of participating URIs, and verifying whether the contact header field of the BYE message is one of the participating URIs.

If the attack was not a BYE attack (block 1440—NO) or a contact header was verified (block 1445), process block 1330 may determine if the attack is a CANCEL attack (block 1450). If the attack is a CANCEL attack (block 1450—YES), process block 1330 may employ IPSec or TLS (block 1455). For example, in one implementation described above in connection with FIG. 3, if the attack is a CANCEL attack, method vulnerability based filter 300 may employ IP security (IPSec) or Transport Layer Security (TLS) to successfully combat a CANCEL attack.

Process block 1330 may continue to "B" of FIG. 14C and may determine whether the attack is a Re-INVITE attack (block 1460). If the attack is a Re-INVITE attack (block 1460—YES), process block 1330 may verify using a transaction-ID or a dialog-IF (block 1465). For example, in one implementation described above in connection with FIG. 3, if the attack is a Re-INVITE attack, method vulnerability based filter 300 may combat this attack by verifying Re-INVITE requests using a Transaction-ID and/or a Dialog-ID.

If the attack is not a Re-INVITE attack (block 1460—NO) or the Re-INVITE requests were verified (block 1465), process block 1330 may determine whether the attack is a REFER attack (block 1470). If the attack is a REFER attack (block 1470—YES), process block 1330 may use S/MIME to enable a REFER target to detect manipulation of referred-by header data (block 1475). For example, in one implementation described above in connection with FIG. 3, if the attack is a REFER attack, method vulnerability based filter 300 may combat this kind of attack by using Secure/Multipurpose Internet Mail Extensions (S/MIME) to enable the REFER target to detect possible manipulation of the Referred-By header data.

Systems and methods described herein may detect and prevent DoS attacks on SIP-based systems. For example, the systems and methods may be capable of distinguishing between valid traffic and DoS attack traffic, may differentiate between attacking packets and legitimate ones by comparing current traffic with a nominal traffic profile, may recognize when a DoS attack has been initiated, and may determine the form of the DoS attack. The systems and methods may also prevent a DoS attack from impacting the performance of a targeted VoIP infrastructure component by employing packet filtering, rate limiting, and message manipulation techniques. The systems and methods may use network calling patterns to determine baselines and "learning" to determine action to be taken on questionable packets. The systems and methods may use statistical analysis and application layer inspection and analysis for detection of attacks. The systems and methods may further maintain adequate bandwidth for known, good calls, may monitor packets lost during analysis, may drop malicious packets and throttle streams, and/or may monitor for and drop illegitimate packets.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 13-14C, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a receiver that receives Session Initiation Protocol (SIP) messages;
   processing logic to:
      associate a transaction identifier (ID) with each of one or more of the received SIP messages, and
      identify SIP messages associated with a same transaction ID and to reject SIP messages associated with the same transaction ID when a rate of the SIP messages associated with the same transaction ID exceeds a threshold;
   a transmitter to send the received SIP messages not rejected by the processing logic; and
   a content-addressable memory (CAM) for storing information indicative of the transaction ID and the SIP messages, wherein the processing logic identifies the SIP messages associated with the same transaction ID by querying the CAM.

2. A method comprising:
   receiving Session Initiation Protocol (SIP) messages for creating, modifying, or terminating communication sessions;
   associating a transaction identifier (ID) with each of one or more of the received SIP messages;
   rejecting the SIP messages associated with a same transaction ID when a rate or a number of the SIP messages associated with the same transaction ID exceeds a threshold;
   forwarding the received SIP messages when the rate or the number of the SIP messages associated with the same transaction ID does not exceed the threshold; and
   querying a content-addressable memory (CAM) for storing information indicative of the transaction ID and SIP messages to identify the SIP messages associated with the same transaction ID.

3. A method of comprising:
   receiving Session Initiation Protocol (SIP) messages for creating, modifying, or terminating communication sessions;
   associating a transaction identifier (ID) with each of one or more of the received SIP messages;
   rejecting the SIP messages associated with a same transaction ID when a rate or a number of the SIP messages associated with the same transaction ID exceeds a threshold;
   forwarding the received SIP messages when the rate or the number of the SIP messages associated with the same transaction ID does not exceed the threshold; and
   querying a content-addressable memory (CAM) for storing information indicative of the transaction ID and SIP messages to identify the SIP messages associated with the same transaction ID,
   wherein the information indicative of the transaction ID is a fixed length and not dependent on a length of the transaction ID.

* * * * *